R. W. BOWMAN.
Grinding Mill.
No. 95,557.
Patented Oct. 5, 1869.
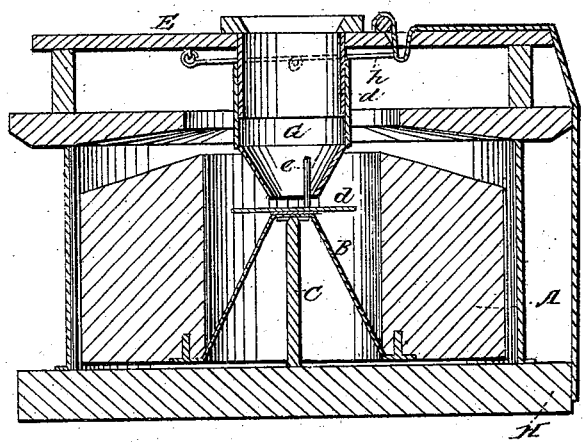
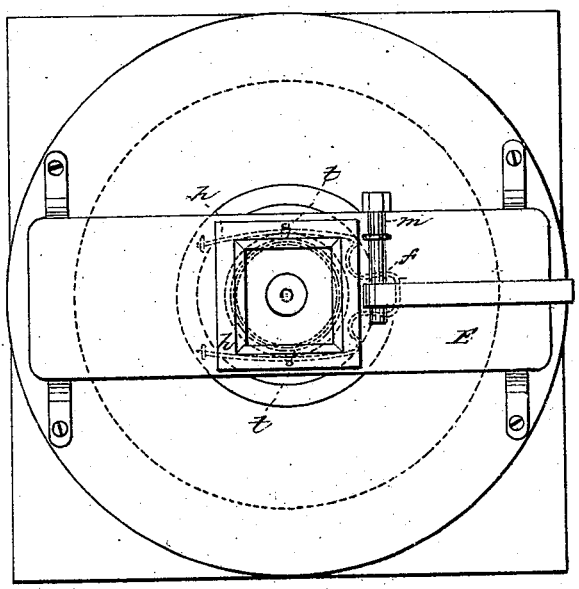

United States Patent Office.

RIGHTER W. BOWMAN, OF ORANGEVILLE, PENNSYLVANIA.

Letters Patent No. 95,557, dated October 5, 1869.

IMPROVEMENT IN GRINDING-MILLS.

The Schedule referred to in these Letters Patent and making part of the same.

*To all whom it may concern:*

Be it known that I, RIGHTER W. BOWMAN, of Orangeville, in the county of Columbia, and State of Pennsylvania, have invented certain new and useful Improvements in Mills; and I do hereby declare that the following is a full, clear, and exact description thereof, reference being had to the accompanying drawings, and to the letters of reference marked thereon, which form a part of this specification, in which—

Figure 1 represents a central vertical section of my invention.

Figure 2 is a plan view of the same.

The nature of my invention consists in constructing a spreader and an adjustable funnel, when operated in the manner set forth, for regulating the feed in grist-mills.

A represents the upper millstone or runner.

B, the balance-rind, which is let into the face of the stone, in the usual manner.

C represents the spindle on which the stone A is poised.

To the top of balance-rind B is secured the spreader $d$, which consists of a metal disk, with the vertical post $e$ firmly attached to its upper surface.

The post $e$ will be placed about midway between the centre and circumference of disk or spreader $d$.

E designates a platform, supported on cleats screwed to the top of hoop F.

An opening is made in platform E for receiving the hopper.

Into said opening a metal tube, $g$, is inserted, the top of which will be flush with the upper surface of platform E.

G designates the seed-funnel, the upper portion of which embraces the tube $g$.

$h$ represents a forked-metal feeding-device, the tines of which extend on opposite sides of seed-funnel G, and, when united, form a loop, $f$.

The tines of feeding-device $h$ are connected by vertical links $t$ to the funnel G. (See dotted lines, fig. 2.)

$m$ is a horizontal roller, one end of which operates over a slot in platform E, in the following manner:

The upper end of a strap, $s$, is fastened to said roller, the strap is then passed through the loop $f$ in feeding-device $h$, and thence will be carried over the end of platform E, and to the husk-frame H.

By means of said strap the funnel G can be elevated or lowered as the case may require.

In operating my improvement it will be seen that when the stone is in motion, the post $e$ on spreader $d$ will describe a circle inside the funnel G, and, by the constant agitation of the grain, tend to equalize the quantity as it descends through the eye of the runner.

Having thus described my invention,

What I claim, and desire to secure by Letters Patent, is—

1. The disk or spreader $d$, secured at or upon the top of the spindle C, and provided with post or stirrer $e$, all arranged in the manner and for the purpose described.

2. The arrangement, herein described, of the roller $m$, rods or arms $h$, tube $g$, and funnel G, in combination with the disk $d$, having post $e$, all constructed and operating as set forth.

In testimony that I claim the foregoing as my own, I affix my signature, in presence of two witnesses.

R. W. BOWMAN.

Witnesses:
 E. L. SNYDER,
 D. K. SLOAN.